Oct. 17, 1933.  L. B. BUTTERFIELD  1,931,054
MEASURING APPARATUS
Filed Oct. 9, 1930
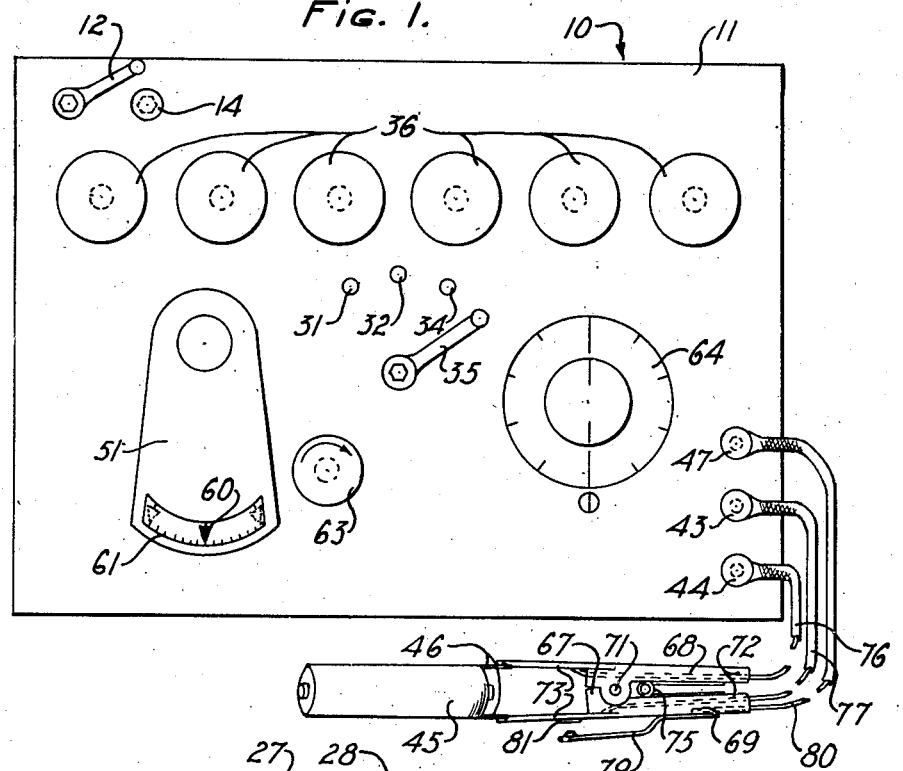
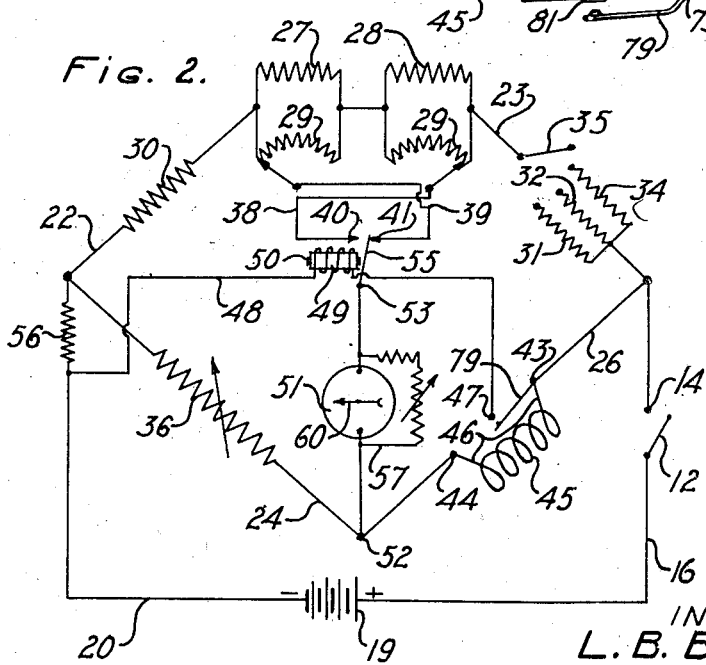
INVENTOR
L. B. BUTTERFIELD
BY
E. R. Nowlan
ATTORNEY Patented Oct. 17, 1933

1,931,054

UNITED STATES PATENT OFFICE 1,931,054

MEASURING APPARATUS

Louis B. Butterfield, Hillside, N. J., assignor to Western Electric Company, Incorporated, New York, N. Y., a corporation of New York Application October 9, 1930. Serial No. 487,484

1 Claim. (Cl. 175—183)

This invention relates to measuring apparatus, and more particularly to apparatus for measuring electrical properties.

An object of the invention is to provide a simple, compact, and reliable apparatus for expeditiously testing material.

Determination whether the resistance of a winding or other article of electrical equipment is within predetermined limits is facilitated when the operator is require to use but one hand in conducting the test steps. This is practicable when an electrical testing apparatus is used wherein a portable holding fixture is adapted to insert a specimen winding in one arm of a Wheatstone bridge having a galvanometer connected through the normally closed contacts of a relay to the adjusted low limit resistance point of another arm. A switch in the fixture is provided for operating the relay to transfer the galvanometer to the adjusted high limit resistance point in a third arm. The ratio arms employ manganin, copper and nickel-silver to facilitate temperature corrections and the galvanometer is shunted to control the sensitivity thereof.

A better understanding of the invention will be had from the following detailed description read in conjunction with the accompanying drawing forming a part thereof, in which Fig. 1 represents diagrammatically a plan view of a testing apparatus embodying the features of the invention, and Fig. 2 is a diagrammatic drawing of the circuits employed.

Referring to the drawing wherein similar parts are indicated by identical reference numerals in the several views, a conventional rectangular test box generally indicated by the numeral 10 is provided with a panel top 11 of the usual type, having at one corner thereof a switch arm 12 adapted to engage a terminal 14 (Figs. 1 and 2). The terminal lies in a conductor 16 which connects with a battery or other suitable sources of electrical energy 19, from the opposite side of which extends a conductor 20. It will be understood that the current supplied from the battery 19 operates the testing circuits. The conductors 16 and 20 are electrically connected at either end of a Wheatstone bridge circuit, having at the left side (at shown in Fig. 2) a fixed ratio arm 22 and at the right side a fixed ratio arm 23 connected thereto. A standard arm 24 and an unknown or test arm 26 complete the conventional bridge. Connected in series with the fixed ratio arms 22 and 23, respectively, are fixed resistances 27 and 28, with each of which is connected in parallel a potentiometer 29. These potentiometers are instrumental in a manner to be explained hereinafter, in unbalancing the Wheatstone bridge to any desired percent.

A fixed resistance 30 is connected in the ratio arm 22. The resistance of the ratio arm 23 is provided by either of three ratio sections 31, 32 and 34 connected therein, consisting respectively of resistances of manganin, nickel-silver and copper. A three-way switch 35 is connected in the arm 23 and adapted to bring into the circuit either of the ratio sections 31, 32 or 34. This arrangement renders it possible to test articles with greater accuracy irrespective of the material of which they may be constituted, since, if an article under test be copper, the switch 35 may be turned to connect to the ratio section 34 which is also composed of copper, thus rendering it unnecessary to check temperature corrections. Likewise, if the part under test be composed of nickel-silver, the switch 35 is disconnected from the section 34 and connected with the section 32 in order to bring into the circuit the ratio section composed of nickel-silver. When the part is composed of manganin, connection may therefore be established with the ratio section 31.

The standard arm 24 is provided with a conventional adjustable resistance 36 in order that any desired resistance may be set up in the arm to balance the estimated resistance of the specimen under test in accordance with the well known practice. The contact arm of the potentiometer 29 connected to the resistance 28 is connected by a conductor 38, and the contact arm of the opposite potentiometer 29 is connected by a conductor 39, to spaced terminal posts 40 and 41, respectively. The conductor 26, comprising the unknown or test arm of the bridge, is provided with spaced terminals 43 and 44 with which a coil or other specimen 45 to be tested is connected. The test specimen, in the particular instance, is provided with a pair of projecting plus and minus leads 46—46, and adjacent thereto, (Fig. 2) is a terminal 47 which is connected to a conductor 48 extending therefrom to the conductor 20, and in which is connected a relay 49 having a core 50. The relay 49 controls a galvanometer 51 which is connected between a terminal 52 connecting the unknown and standard arms of the bridge and a terminal 53 of the relay, upon which is mounted an armature 55 adapted to operate between the terminals 40 and 41, and to be normally positioned in connection with the terminal 41 by the relay. A non-inductive safety resistance 56 is interposed with the conductor 20 between the battery 19 and the Wheatstone bridge, and in order to control the sensitivity of the galvanometer and to regulate electrical effects thereon, a variable shunt 57 is connected therearound. The galvanometer 51 is provided with an indicating needle 60, and a suitably graduated scale 61 (Fig. 1) in the panel top 11, and a control knob 63 adjacent thereto is provided for controlling the shunt 57.

The top is also provided with a suitably graduated percentage dial 64 by rotating which the values of the potentiometers 29 may be simultaneously varied. For instance, if it be assumed that the specified resistance of the part 45 is five hundred ohms, the value of the standard arm is established by adjusting the resistance 36 to five hundred ohms in order to balance with the test arm. The resistance 30 and the individual values of the ratio resistance sections 31, 32 and 34 are necessarily equal, in the present case being assumed to be five hundred ohms each, also. When it is desired to ascertain whether the resistance of the part 45 is as specified and the permissible maximum and minimum limits of variations therefrom are five percent each, the percentage dial 64 is adjusted to simultaneously vary the potentiometers 29 with respect to the resistances 27 and 28 in order to unbalance the bridge plus five percent and minus five percent, respectively, as indicated in Fig. 2.

In connection with the apparatus described, a fixture 67 is used consisting of a pair of similar lever arms 68 and 69 being substantially centrally pivotally joined at 71. The levers are provided with tubular stocks 72—72 at one side of the pivot 71 and with elongated reduced contact arms 73—73 in the other side of the pivot 71. It is obvious that by pressing the stocks 72 closely together, the contact arms will spread apart, and vice versa. In order to insure that the fixture may closely engage the part under test and that a good electrical connection may be always established between the part and the contact arms 73—73, a coil spring 75 is positioned between the stocks 72—72 tending to spread them, thus causing the contact arms to normally be urged together. A conductor 76 passes through the lever 68 and makes an electrical connection between the contact arm 46 thereof and the terminal 44, and a similar conductor 77 extends through the lever 69 making an electrical connection between the contact arm 46 thereof and the terminal 43, thus establishing a testing circuit for testing the high limit of the part. A spring arm 79 is secured to the outer surface of the lever 69 and is electrically connected by means of a conductor 80 to the terminal 47. The terminal 47 is connected in circuit with the terminal 43 to operate the relay to cause the armature 55 to engage the terminal 40. This is accomplished by pressing the spring arm 79 so as to cause it to engage a contact disc 81 secured to the outer surface of the contact arm 46 of the lever 69, thus simultaneously changing the reading of the galvanometer to indicate the low limit resistance of the part under test.

In the practical field, it is customary to test large numbers of parts of the same description, and it is therefore unnecessary to adjust the apparatus during the testing of the entire group, it being customary to set the knobs 36 to give the desired resistance in the standard arm 24 to balance the specified resistance of the test specimen 45. The percentage dial 64, which may be suitably graduated, is then rotated to position the potentiometers 29—29 to give the proper high and low percentage limits. The switch 35 is then connected to either of the ratio sections 31, 32 or 34 to correspond with the material of the part under test and the knob 63 is adjusted to give the proper sensitivity to the galvanometer 51.

The switch 12 is then closed to the terminal 14, setting up a flow of current such as to cause the needle of the galvanometer to move to the left of the center point or position of rest on the scale 61. This current flows from the source 19 along the conductor 16 across the switch 12 and terminal 14 to the bridge, along a selected ratio section and fixed arm 23 across the resistances 28 and 27, resistance 30, fixed arm 22, resistance 56 and conductor 20 to the source. At the resistance 27 a portion of the current flows through the potentiometer 29 thereof along conductor 39, through terminal 41 and armature 55, terminal 53, through the galvanometer 51 and shunt 57 to terminal 52, through the standard arm 24, variable resistance 36 and resistance 56, and along conductor 20 to the source. The switch 12 having been closed, the operator is then free to employ both hands in handling and sorting the specimens 45 while they are being tested, it being sufficient that the test cabinet 10 be sufficiently close that the scale 61 may be read. When desired, the testing may be carried on at a considerable distance from the test box, the results of the test being indicated remotely in any well known manner, as by visual or audible signals.

In the arrangement described the relay 49 is effective to normally urge the armature in contact with the terminal 41. Consequently, it is preferable to test the part for the high resistance limit first. This is accomplished by grasping the stocks of the fixture in the hand and by compressing them, separating the contact arms 73 and placing them over the leads 46 of the article 45 being tested. The pressure on the stocks is then released and the leads are clamped firmly between the contact arms of the fixture. The circuit thus closed may be traced from the positive side of the source 19 through conductor 16, switch 12 and terminal 14 to the bridge where the current divides, a portion thereof passing through conductor 26, terminal 43, test part 45, terminals 44 and 52 along conductor 24 of the standard arm through resistances 36 thereof and the safety resistance 56, along conductor 20 to the source. If the resistance of the test specimen is less than the established high limit, a portion of the current divides at terminal 52, flows through galvanometer 51 and shunt 57, terminal 53, armature 55, contact 41, conductor 39, potentiometer 29, resistance 27, fixed resistance 30, arm 22, protective resistance 56, conductor 20 to the source, causing the galvanometer to deflect to the right of the mid point of scale 61. Another portion flows through the appropriate ratio section, switch 35, fixed arm 23 of the bridge and resistances 28 and 27, portions thereof passing through the potentiometers 29, along the fixed ratio arm 22 and resistance 30, resistance 56 and conductor 20 to the source. If the resistance of the coil or specimen is equal to or greater than the high limit, no current will flow through the galvanometer, or the current will flow in the opposite direction, namely, from 53 to 52 as the case may be, and the needle will stop at or short of the mid point of the galvanometer scale.

The high limit test having been made, the operator presses the spring arm 79 to connect with contact disc 81, thus setting up a circuit and actuating the relay 49 to test for the low limit as follows: From the source 19, conductor 16, switch 12 and terminal 14, as before, to the bridge along conductor 26 of the test arm, through terminal 43 to terminal 47, through the relay 49, along conductor 48 to conductor 20 and return to the source. Energizing the relay causes the armature 55 to break connection with terminal 41 and make connection with the terminal 40 and thereby, if the resistance of the specimen is greater than the established low limit, establishes a current flow traversing conductor 26, terminal 43, test part 45, terminals 44 and 52, across the galvanometer 51 and shunt 57 to terminals 53 and 40, along the conductor 38, potentiometer 29, resistances 28 and 27, potentiometer 29, fixed ratio arm 22 and resistance 30, resistance 56 and conductor 20 to the source. The current passing through the galvanometer causes a deflection of the needle to the left of the mid point of the scale. If the resistance of the specimen is equal to or less than the low limit, no current will flow through the galvanometer or the current will flow from 53 to 52 as the case may be, causing the needle to stop at the mid point of the scale or to the right thereof. A flow is also established under this condition and goes across the upper arms of the bridge through a selected ratio section 31, 32 or 34, switch 35, arm 23, across the resistances 28 and 27, potentiometers 29, arm 22, resistance 56, conductor 20 to the source.

The reading resulting in the above circuit is practically instantaneous, high and low resistances of the part being thereby gauged, from which may be determined whether the part is acceptable or should be rejected. The operator may then detach the fixture from the part by compressing the stocks and placing the contact arms upon the leads of the next part upon which the test is to be made, the first reading being then secured as above by making initial contact with the leads of the part, and the second test being made by compressing, as with a finger, the spring arm 79 upon the contact disc 81.

Tests made with the apparatus and in the method above described are reliable, affording a high degree of accuracy, and many more tests can be made in a given period of time than formerly, resulting in a greater production. Another important advantage is secured by conducting tests as described, in that it lessens fatigue of the operator by rendering it possible to conduct both high and low limit tests in rapid succession with one hand, leaving the other hand free for sorting the work, et cetera.

What is claimed is:

In a Wheatstone bridge circuit for determining the resistance of a test specimen, a fixed ratio arm having a plurality of sections therein and composed of different materials, a switch for selectively bringing one of the sections into the circuit, means associated with the ratio arm of the bridge to determine whether the resistance of said specimen lies between certain specified maximum and minimum resistance limits and normally operative to determine whether the resistance of the specimen lies within one of said specified limits, a relay for controlling the determining means to render it operative to determine whether the resistance of the specimen lies within the other specified limits, means engaging the specimen, and means associated with the specimen engaging means for controlling the operation of the relay.

LOUIS B. BUTTERFIELD.